US012561838B2

(12) United States Patent
Sung et al.

(10) Patent No.: US 12,561,838 B2
(45) Date of Patent: Feb. 24, 2026

(54) METHOD AND APPARATUS WITH SENSOR CALIBRATION

(71) Applicant: Samsung Electronics Co., Ltd., Suwon-si (KR)

(72) Inventors: Kapje Sung, Suwon-si (KR); Daeul Park, Suwon-si (KR); Dongwook Lee, Hwaseong-si (KR); Jaewoo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 618 days.

(21) Appl. No.: 17/575,092

(22) Filed: Jan. 13, 2022

(65) Prior Publication Data

US 2022/0414933 A1 Dec. 29, 2022

(30) Foreign Application Priority Data

Jun. 25, 2021 (KR) ........................ 10-2021-0082866

(51) Int. Cl.
*G06T 7/80* (2017.01)
*G06T 7/73* (2017.01)
(52) U.S. Cl.
CPC .................. *G06T 7/80* (2017.01); *G06T 7/73* (2017.01); *G06T 7/85* (2017.01); *G06T 2207/30204* (2013.01); *G06T 2207/30252* (2013.01)
(58) Field of Classification Search
None
See application file for complete search history.

(56) References Cited

U.S. PATENT DOCUMENTS

| | | | | |
|---|---|---|---|---|
| 5,559,695 A | * | 9/1996 | Daily | ..................... G01S 11/12 701/1 |
| 6,704,621 B1 | * | 3/2004 | Stein | ....................... G01S 11/12 382/104 |
| 9,978,146 B2 | | 5/2018 | Hedi et al. | |

(Continued)

FOREIGN PATENT DOCUMENTS

| | | |
|---|---|---|
| CN | 108596982 A | 9/2018 |
| CN | 109615659 A | 4/2019 |

(Continued)

OTHER PUBLICATIONS

Shin, Bok-Suk, et al. "Vision-based navigation of an unmanned surface vehicle with object detection and tracking abilities." Machine Vision and Applications 29.1 (2018): 95-112.

(Continued)

*Primary Examiner* — Bernard Krasnic
(74) *Attorney, Agent, or Firm* — NSIP Law

(57) ABSTRACT

A processor-implemented method with sensor calibration includes: estimating a portion of a rotation parameter for a target sensor among a plurality of sensors based on a capture of a reference object; estimating another portion of the rotation parameter for the target sensor based on an intrinsic parameter of the target sensor and a focus of expansion (FOE) determined based on sensing data collected with consecutive frames by the target sensor while the electronic device rectilinearly moves based on one axis; and performing calibration by determining a first extrinsic parameter for the target sensor based on the portion and the other portion of the rotation parameter.

19 Claims, 13 Drawing Sheets

(56) References Cited

U.S. PATENT DOCUMENTS

| | | | | |
|---|---|---|---|---|
| 10,902,641 | B2 * | 1/2021 | Hafner | G06T 7/80 |
| 2006/0120609 | A1 * | 6/2006 | Ivanov | G06V 10/811 |
| | | | | 382/190 |
| 2009/0243889 | A1 * | 10/2009 | Suhr | G08G 1/168 |
| | | | | 340/932.2 |
| 2012/0287232 | A1 | 11/2012 | Natroshvili et al. | |
| 2012/0308114 | A1 * | 12/2012 | Othmezouri | G06T 7/285 |
| | | | | 382/154 |
| 2017/0294002 | A1 * | 10/2017 | Jia | G06T 7/80 |
| 2018/0253899 | A1 | 9/2018 | Schrepfer | |
| 2021/0092354 | A1 | 3/2021 | Shivalingappa et al. | |

FOREIGN PATENT DOCUMENTS

| | | | |
|---|---|---|---|
| EP | 2 172 873 A2 | 4/2010 | |
| EP | 3 259 732 B1 | 11/2018 | |
| JP | 2008193181 A * | 8/2008 | |
| KR | 10-0948886 B1 | 3/2010 | |
| KR | 10-1241012 B1 | 3/2013 | |
| KR | 10-2017-0111504 A | 10/2017 | |
| KR | 10-2017-0124232 A | 11/2017 | |
| KR | 10-2018-0001869 A | 1/2018 | |
| KR | 10-1989370 B1 | 6/2019 | |
| KR | 10-2020-0137214 A | 12/2020 | |
| KR | 10-2021-0019925 A | 2/2021 | |
| RU | 2704772 C2 * | 10/2019 | B60R 25/10 |

OTHER PUBLICATIONS

Extended European search report issued on Sep. 14, 2022, in counterpart European Patent Application No. 22164130.1 (12 pages in English).

* cited by examiner

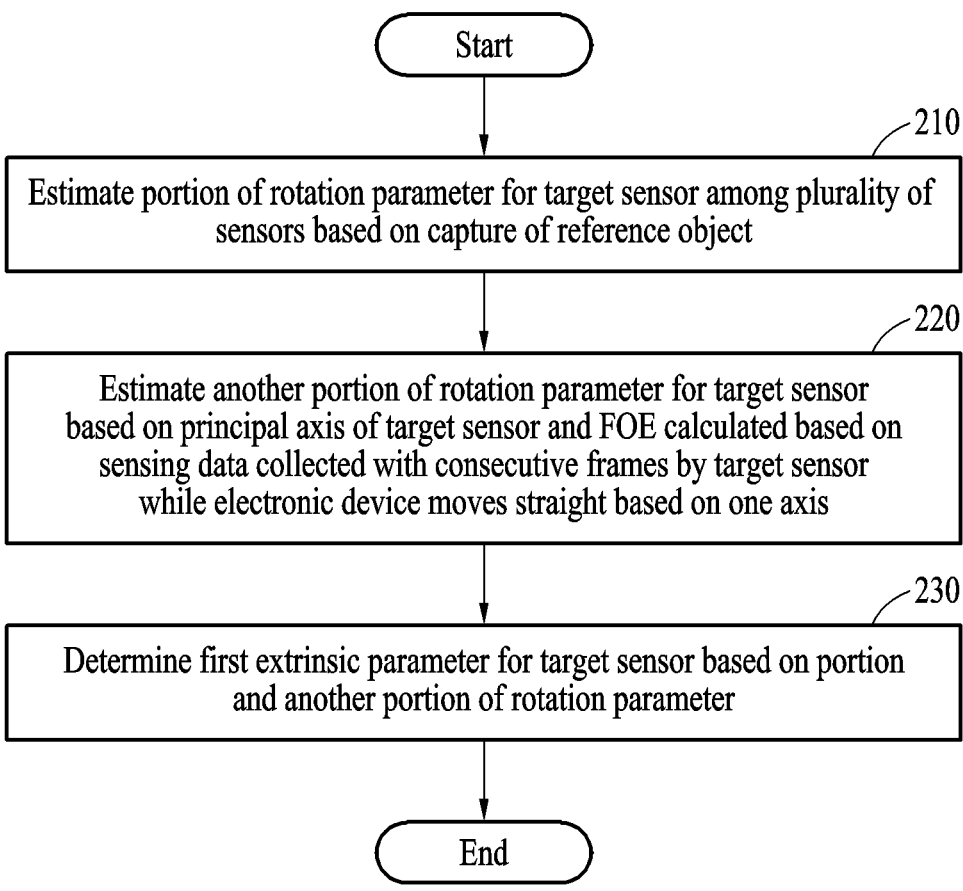

Start

210

Estimate portion of rotation parameter for target sensor among plurality of sensors based on capture of reference object

220

Estimate another portion of rotation parameter for target sensor based on principal axis of target sensor and FOE calculated based on sensing data collected with consecutive frames by target sensor while electronic device moves straight based on one axis

230

Determine first extrinsic parameter for target sensor based on portion and another portion of rotation parameter End

Plurality of sensors 1210

Processor 1220

Memory 1230

METHOD AND APPARATUS WITH SENSOR CALIBRATION

CROSS-REFERENCE TO RELATED APPLICATIONS

This application claims the benefit under 35 USC § 119(a) of Korean Patent Application No. 10-2021-0082866, filed on Jun. 25, 2021 in the Korean Intellectual Property Office, the entire disclosure of which is incorporated herein by reference for all purposes.

BACKGROUND

1. Field

The following description relates to a method and apparatus with sensor calibration.

2. Description of Related Art

A surround view monitor (SVM) system may be applied to vehicles. The SVM system may process and synthesize images captured by four cameras provided in a vehicle and provide an image of a surround view of the vehicle, allowing a driver to view the surroundings of the vehicle at one glance. The SVM system may be used for providing an image in a parking situation, but may also be applied to autonomous driving or advanced driver assistance systems. Camera calibration in the SVM system may be basically performed in a vehicle production process. Through the camera calibration, coordinate system conversion information for converting coordinate systems between a vehicle and cameras may be obtained. Image synthesis may be performed and the distance to a nearby vehicle or pedestrian may be estimated using the obtained coordinate system conversion information. End of line (EOL) calibration performed in the production process may require the task of aligning the rotation and translation between a vehicle and a floor pattern using a centering device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with sensor calibration includes: estimating a portion of a rotation parameter for a target sensor among a plurality of sensors based on a capture of a reference object; estimating another portion of the rotation parameter for the target sensor based on an intrinsic parameter of the target sensor and a focus of expansion (FOE) determined based on sensing data collected with consecutive frames by the target sensor while the electronic device rectilinearly moves based on one axis; and performing calibration by determining a first extrinsic parameter for the target sensor based on the portion and the other portion of the rotation parameter.

The estimating of the portion of the rotation parameter may include: identifying a plurality of corner points from the sensing data as reference points; and determining whether the reference object is in the capture based on the plurality of identified corner points.

The estimating of the portion of the rotation parameter may include: identifying a reference marking from the reference object identified from sensing data generated through the target sensor; determining an orientation of the reference object based on the reference marking; and estimating the portion of the rotation parameter based on the determined orientation.

The estimating of the portion of the rotation parameter based on the determined orientation may include: determining default coordinate information according to a world coordinate system that is based on the reference marking for a plurality of reference points of the reference object; and estimating the portion of the rotation parameter based on coordinate information determined by projecting the default coordinate information to an image coordinate system based on the determined orientation and coordinate information detected for the plurality of reference points in the sensing data.

The estimating of the portion of the rotation parameter may include determining either one or both of a rolling component and a pitch component of the rotation parameter.

The estimating of the other portion of the rotation parameter may include determining a yaw component of the rotation parameter in the first extrinsic parameter.

The method may include determining a translation component in the first extrinsic parameter based on dimension data indicating a positional relationship in which the target sensor is disposed in the electronic device.

The method may include determining a height component of a translation component in the first extrinsic parameter based on either one or both of dimension data for the target sensor and a translation component between the reference object and the target sensor determined according to the capture of the reference object.

The determining of the first extrinsic parameter may include: determining first candidate extrinsic parameters respectively for at least a portion of a plurality of frames; and determining the first extrinsic parameter by integrating the first candidate extrinsic parameters.

The determining of the first extrinsic parameter may include removing an outlier value from the first candidate extrinsic parameters and integrating the remaining values.

The method may include performing coordinate conversion between a coordinate system of the target sensor and a ground coordinate system, using the determined first extrinsic parameter.

The method may include performing calibration of a second extrinsic parameter between two different sensors, in response to a common reference object being identified at the same time from sensing data captured by the two different sensors among the plurality of sensors.

The performing of the calibration of the second extrinsic parameter may include determining, by the two different sensors, the second extrinsic parameter between the target sensor and another sensor using an extrinsic parameter between the reference object and the target sensor and an extrinsic parameter between the reference object and the other sensor.

The method may include performing coordinate conversion between a coordinate system of the target sensor and a coordinate system of the other sensor, using the determined second extrinsic parameter.

In response to only a sensor disposed on one side of the electronic device detecting the reference object among the plurality of sensors, the electronic device is configured to move such that a sensor disposed on a side opposite to the one side based on a center of the electronic device detects the reference object.

The range of a field of view of the target sensor may include a longitudinal axis of a ground coordinate system set for the electronic device.

The plurality of sensors may include any one or any combination of any two or more of camera sensors, lidar sensors, infrared sensors, and ultrasonic sensors.

The electronic device is, or is mounted on, any one or any combination of any two or more of a drone, a vehicle, and a drivable robot.

In another general aspect, one or more embodiments include a non-transitory computer-readable storage medium storing instructions that, when executed by a processor, configure the processor to perform any one, any combination, or all operations and methods described herein.

In another general aspect, an electronic device includes: one or more processors configured to: estimate a portion of a rotation parameter for a target sensor among a plurality of sensors based on a capture of a reference object; estimate another portion of the rotation parameter for the target sensor based on an intrinsic parameter of the target sensor and a focus of expansion (FOE) determined based on sensing data collected as consecutive frames by the target sensor while the electronic device rectilinearly moves based on one axis; and perform calibration by determining a first extrinsic parameter for the target sensor based on the portion and the other portion of the rotation parameter.

The device may be a vehicle further comprising the plurality of sensors disposed such that at least a portion of a field of view of each sensor overlaps a field of view of another sensor.

In another general aspect, a processor-implemented method with sensor calibration includes: determining a first extrinsic parameter corresponding to a first sensor based on a frame of a reference object collected by the first sensor at a first time and a focus of expansion (FOE) of frames collected by the first sensor at different times; determining a second extrinsic parameter corresponding to a second sensor based on a frame of the reference object collected by the second sensor at the first time; and performing coordinate conversion based on the first extrinsic parameter and the second extrinsic parameter.

The first extrinsic parameter may be for conversion between a coordinate system of the first sensor and a ground coordinate system of the reference object, and the second extrinsic parameter may be for conversion between the coordinate system of the first sensor and a coordinate system of the second sensor.

The determining of the first extrinsic parameter may include: determining a rolling component and a pitch component of the first extrinsic parameter based on the frame of the reference object collected by the first sensor; and determining a yaw component of the first extrinsic parameter based on the FOE.

The determining of the yaw component may include determining the yaw component based on an angular difference between a principal axis of the first sensor and a direction toward the FOE.

The method may include controlling one or more operations of a vehicle using a result of the coordination conversion.

Other features and aspects will be apparent from the following detailed description, the drawings, and the claims.

BRIEF DESCRIPTION OF THE DRAWINGS

FIG. 2 illustrates an example of a sensor calibration method.

Figure 1:
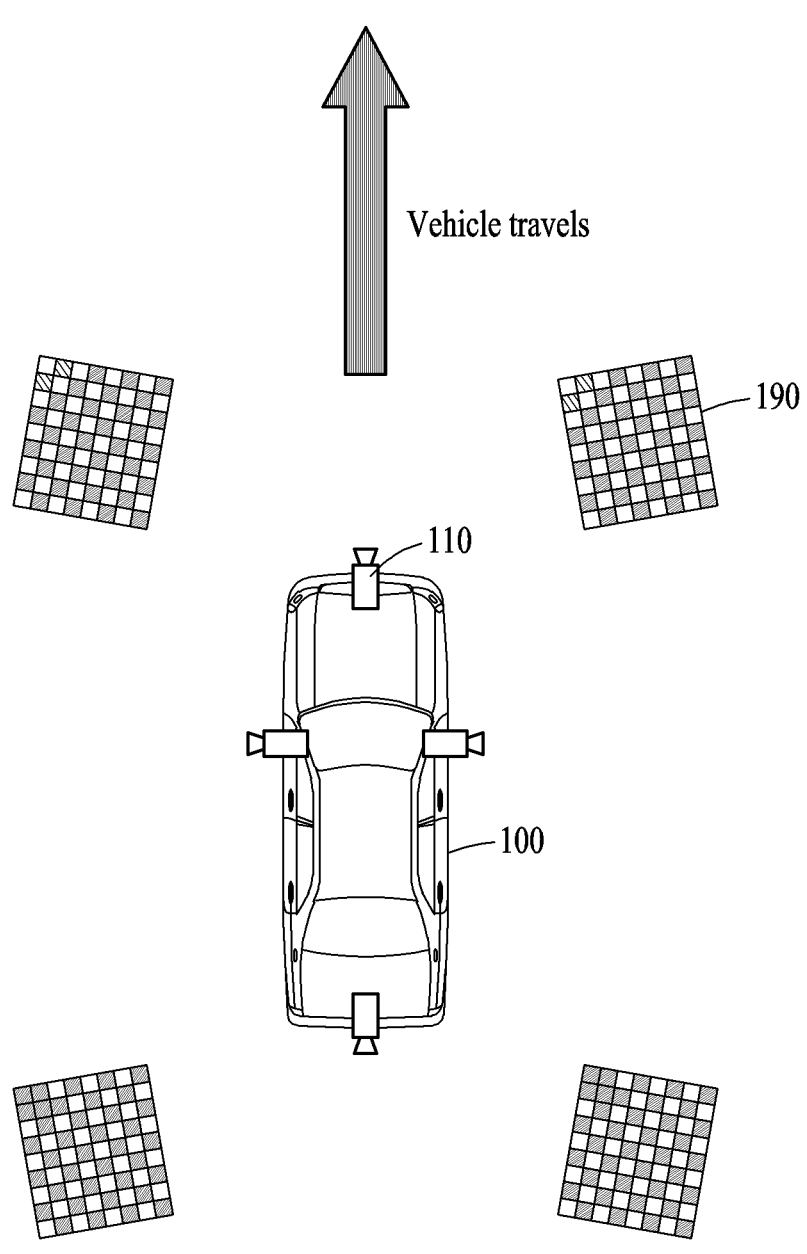
FIG. 1 illustrates an example of sensor calibration.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of sensor calibration.

Referring to FIG. 1, an electronic device 100 may include a plurality of sensors 110. The electronic device 100 may perform sensor calibration for the plurality of sensors 110. Herein, sensor calibration may refer to an operation of determining an extrinsic parameter of a sensor. The extrinsic parameter may be a parameter that describes a coordinate conversion relationship from one coordinate system to another coordinate system. The extrinsic parameter may include a rotation component and a translation parameter between the two coordinate systems. Of the extrinsic parameter, a parameter indicating a rotation component may be referred to as a rotation parameter, and a parameter indicating a translation component may be referred to as a translation parameter. As examples of extrinsic parameters, a parameter describing coordinate conversion between a world coordinate system that is based on a reference object 190 and a coordinate system of a sensor (for example, "sensor coordinate system"), a parameter describing coordinate conversion between a ground coordinate system and the sensor coordinate system (hereinafter, "first extrinsic parameter"), and a parameter describing coordinate conversion between sensors 110 (hereinafter, "second extrinsic parameter") will be described later. For example, the first extrinsic parameter may be or include a coordinate conversion matrix that converts coordinates according to the sensor coordinate system into coordinates according to the ground coordinate system. For example, Equation 6 below describes a rotation parameter in the first extrinsic parameter, wherein the rotation parameter rotates the coordinates according to the sensor coordinate system to the coordinates according to the ground coordinate system. The second extrinsic parameter may be or include a coordinate conversion matrix that converts coordinates according to a sensor coordinate system of a target sensor (of the sensors 110, for example) into coordinates according to a sensor coordinate system of another sensor (of the sensors 110, for example). For example, Equation 5 below describes an extrinsic parameter for rotating and translating coordinates according to a sensor coordinate system of a front camera sensor to coordinates according to a sensor coordinate system of a right camera sensor.

In the example of FIG. 1, the electronic device 100 may be implemented as a vehicle or may be mounted on or in the vehicle, a plurality of sensors 110 may be disposed to face four orientations of front, rear, and both sides, and the sensor may be a camera sensor. The sensors 110 may be mounted on a vehicle, as described above, for surround view monitor (SVM). Herein, for ease of description, sensor calibration for SVM (for example, SVM camera calibration) is mainly described as an example. However, examples are not limited thereto.

The SVM camera calibration may include end of line (EOL) calibration performed at an EOL, which may be the last process or one of the last processes of a vehicle production process, and calibration at an after-sales service (A/S) center.

In EOL calibration, a separate physical space for calibration may be prepared. For example, the reference object 190 may be installed in the space for calibration. In the example of FIG. 1, spaces in which four reference objects 190 are prepared are shown. For reference, the reference object 190 may be an object serving as a reference for calibration, non-limiting examples of which will be further described below with reference to FIGS. 5A and 5B.

The electronic device 100 mounted on or in the vehicle and/or implemented as the vehicle may capture the reference object 190 using the sensors 110 (for example, camera sensors 110) mounted for the SVM system. The electronic device 100 may obtain (e.g., determine) extrinsic parameters (for example, rotation and translation parameters) between the world coordinate system that is based on the reference object 190 and the sensor coordinate system, based on a pattern of the reference object 190. For example, the electronic device 100 may determine one or more components of the first extrinsic parameter (for example, a rolling component and a pitch component of the rotation parameter) between the ground coordinate system and the sensor coordinate system using the rotation parameters obtained using the reference object 190. The rotation parameter may be a matrix that rotationally converts coordinates along one coordinate system (e.g., the sensor coordinate system) into coordinates according to another coordinate system (e.g., the ground coordinate system). The translation parameter may be a matrix that translates coordinates according to one coordinate system to coordinates according to another coordinate system. In addition, the electronic device 100 may determine another component of the first extrinsic parameter (for example, a yaw component of the rotation parameter) based on sensing data (for example, frame images) collected as consecutive frames during the rectilinear movement (for example, forward or backward movement of the vehicle) in a direction the same as one axis of the ground coordinate system. The electronic device 100 may further determine a second extrinsic parameter between the sensors 110 by using the above-described first extrinsic parameters for the sensors 110. Non-limiting examples of calculating each extrinsic parameter will be further described below with reference to FIGS. 2 to 12.

The electronic device 100 of one or more embodiments may determine the first extrinsic parameter between the sensors and the ground coordinate system, as described above, even when the vehicle (which is the subject of sensor calibration) is not precisely aligned by a centering device at the position and angle defined between the reference objects 190. In other words, even when the electronic device 100 of one or more embodiments (for example, the vehicle) is aligned obliquely with respect to the reference object 190, the electronic device 100 may perform the sensor calibration described above. For example, by performing sensor calibration through sensing data of consecutive frames obtained from the plurality of sensors 110 while passing between the reference objects, the electronic device 100 of one or more embodiments may perform the sensor calibration irrespective of the alignment between the reference object 190 and the electronic device 100. Also, the electronic device 100 of one or more embodiments may obtain certain extrinsic parameters even while the vehicle is stopped. Accordingly, by accurately performing the sensor calibration even when the electronic device 100 is aligned obliquely (and/or irrespective of the alignment) with the reference object 190, the electronic device 100 of one or more embodiments may improve the technological fields of sensor calibration, SVM camera calibration, and SVM systems by reducing a calibration time and a number of operations for calibration compared to typical electronic devices which perform calibration when precisely aligned with a reference object.

Hereinafter, an example of obtaining an extrinsic parameter will be described.

FIG. 2 illustrates an example of a sensor calibration method.

First, in operation 210, an electronic device may estimate a portion of a rotation parameter for a target sensor among a plurality of sensors based on a capture of a reference object. For example, the electronic device may estimate a rolling component and/or a pitch component of a rotation parameter between a ground coordinate system and a sensor coordinate system of the target sensor by using the captured reference object. A non-limiting example of calibration using a reference object will be further described below with reference to FIG. 6.

In operation 220, the electronic device may estimate another portion of the rotation parameter for the target sensor based on an intrinsic parameter of the target sensor and a focus of expansion (FOE) calculated based on sensing data collected with consecutive frames by the target sensor while the electronic device rectilinearly moves based on one axis. For example, the electronic device may estimate a yaw component as an angular difference between a principal axis and an orientation from the target sensor toward the FOE. The electronic device may estimate a yaw component of the rotation parameter between the ground coordinate system and the sensor coordinate system of the target sensor using the FOE and a principal point. Non-limiting examples of the FOE, principal axis, and principal point, and calibration using the same will be further described with below reference to FIG. 7.

Then, in operation 230, the electronic device may determine a first extrinsic parameter for the target sensor based on the portion and the other portion of the rotation parameter. As described above, the first extrinsic parameter for the target sensor may be an extrinsic parameter indicating a coordinate conversion relationship between the ground coordinate system and the sensor coordinate system of the target sensor. For example, the electronic device may determine the rolling component, pitch component, and yaw component, which are parameters estimated in operations 210 and 220, as the rotation parameter of the first extrinsic parameter for the target sensor. In addition, the electronic device may determine a translation parameter of the first extrinsic parameter for the target sensor using dimension data, a non-limiting example of which will be further described later with reference to FIG. 8.

Figure 3:
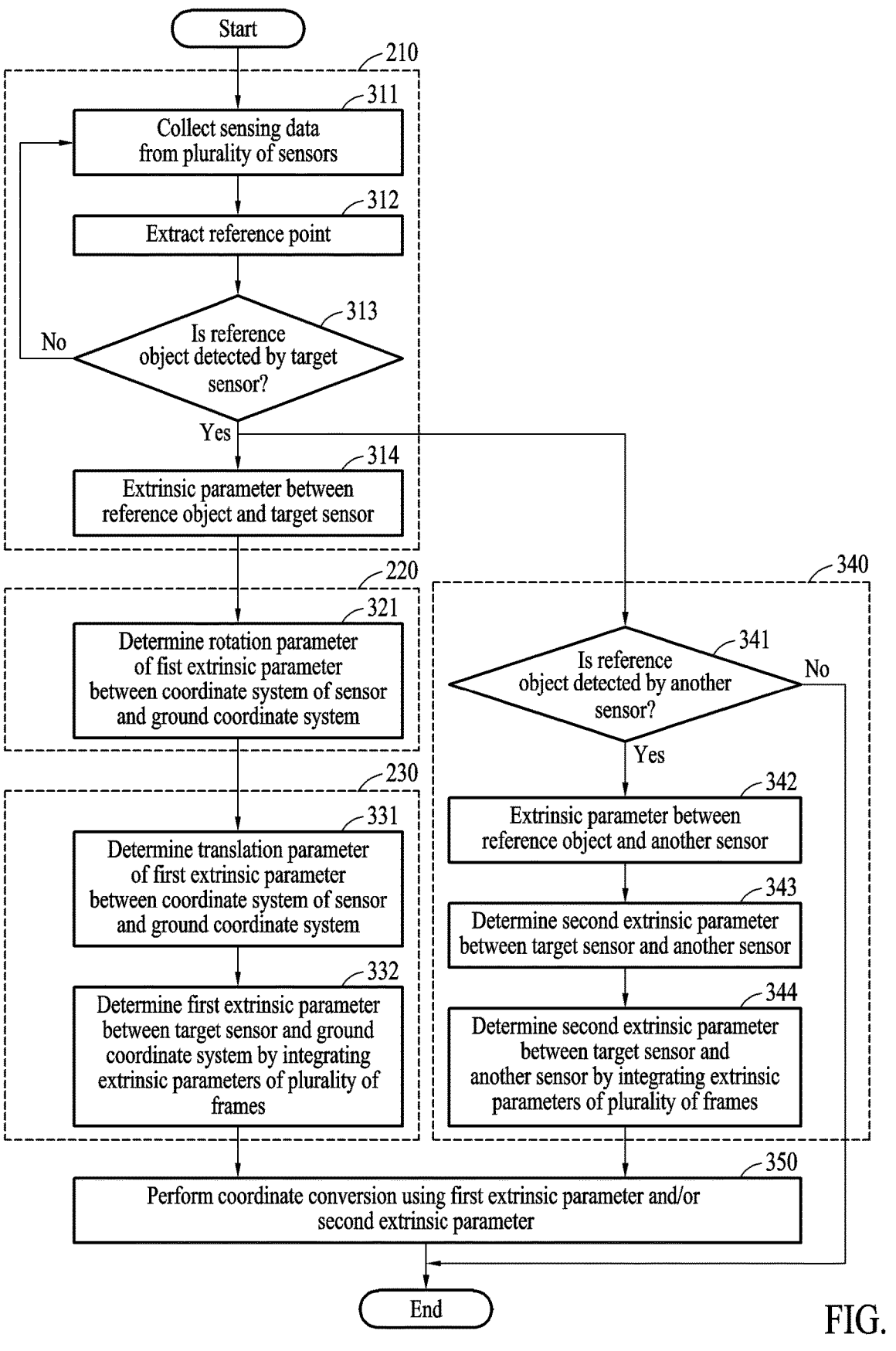
FIG. 3 illustrates an example of a sensor calibration method.

FIG. 3 illustrates an example of a sensor calibration method.

First, in operation 311, an electronic device may collect sensing data from a plurality of sensors. The plurality of sensors may include sensors that generate sensing data by capturing scenes with predetermined fields of view. The plurality of sensors may include any one or any combination of any two or more of camera sensors, infrared sensors, ultrasonic sensors, lidar sensors, and radar sensors. A camera sensor may generate image data (for example, a color image having RGB color channels) by capturing a scene. An infrared sensor may emit infrared rays and sense infrared rays that are reflected from objects and the background present in a scene. An ultrasonic sensor may emit ultrasonic waves and sense reflected ultrasonic waves. A lidar sensor may emit laser light and sense reflected light. A radar sensor may emit radio waves and sense reflected radio waves. Sensing data generated through sensing by an infrared sensor, an ultrasonic sensor, a lidar sensor, and/or a radar sensor may be a depth map showing the distances to objects and the background. The distance to the objects and the background may be determined, for example, based on the intensities of reflected signals and/or the times of flight of signals.

In operation 312, the electronic device may extract a reference point. For example, the electronic device may extract a corner point from the image data. For example, the reference point may be a corner point of a reference object (e.g., the reference object 190).

Then, in operation 313, the electronic device may determine whether the reference object is detected by the target sensor. For example, the electronic device may identify the reference object from the sensing data by using the reference point extracted in operation 312 described above. In response to the reference object not being identified, the electronic device may continue to collect sensing data. In response to the reference object being identified, the electronic device may initiate calibration for the target sensor based on the captured reference object.

In operation 314, the electronic device may estimate an extrinsic parameter between the reference object and the target sensor (e.g., a first extrinsic parameter). The electronic device may estimate an extrinsic parameter indicating a coordinate conversion relationship between a target sensor coordinate system of the target sensor and a world coordinate system that is based on the reference object. When a plane of the reference object is parallel to the ground, a rolling component and a pitch component between the target sensor and the reference object may be the same as a rolling component and a pitch component between the target sensor and the ground. A rolling component and a pitch component of a rotation parameter of the extrinsic parameter estimated in operation 314 may be used as a rolling component and a pitch component of the first extrinsic parameter between the target sensor and the ground coordinate system.

Then, in operation 321, the electronic device may determine a rotation parameter of the first extrinsic parameter between the ground coordinate system and the coordinate system of the target sensor. For example, the electronic device may estimate a yaw component of the rotation parameter of the first extrinsic parameter based on an FOE and intrinsic parameters (for example, a principal point and a focal length).

In operation 331, the electronic device may determine a translation parameter of the first extrinsic parameter between the ground coordinate system and the coordinate system of the target sensor. For example, the electronic device may determine the translation parameter using dimension data indicating the position at which the target sensor is installed and/or a second extrinsic parameter between the cameras. The second extrinsic parameter may be obtained in non-limiting example operations 343 and 344 which will be further described later.

Then, in operation 332, the electronic device may determine the first extrinsic parameter between the target sensor and the ground coordinate system by integrating extrinsic parameters of a plurality of frames. For example, the electronic device may estimate first candidate extrinsic parameters separately for each of at least a portion of the plurality of frames, and integrate the first candidate extrinsic parameters. For example, the electronic device may remove outlier values from the first candidate extrinsic parameters and determine an average value of the remaining first candidate extrinsic parameters as the first extrinsic parameter. However, examples are not limited thereto.

In operation 340, the electronic device may calibrate a second extrinsic parameter between the sensors in response to a common reference object between the sensors being identified.

In detail, in operation 341, the electronic device may determine whether the reference object is also detected by another sensor. The electronic device may determine whether a reference object common to the object detected by the target sensor is detected by the other sensor. The electronic device may determine whether the reference object is detected in a sensing region in which the field of view of the target sensor overlaps the field of view of the other sensor. The detection of the reference object based on sensing data of the other sensor may be performed in a manner the same as and/or similar to that in operations 312 and 313 described above. In response to a common reference object between the target sensor and the other sensor not being identified, the electronic device may skip calibration between the target sensor and the other sensor. The electronic device may initiate calibration between the sensors in response to the common reference object between the sensors being identified.

In operation 342, the electronic device may estimate an extrinsic parameter between the reference object and the other sensor. For example, the electronic device may estimate an extrinsic parameter indicating a coordinate conversion relationship between a sensor coordinate system of the other sensor and the world coordinate system that is based on the captured reference object.

Then, in operation 343, the electronic device may determine a second extrinsic parameter between the target sensor and the other sensor. For example, the electronic device may estimate a second extrinsic parameter indicating a coordinate conversion relationship between the sensor coordinate system of the target sensor and the sensor coordinate system of the other sensor, using the extrinsic parameter estimated for the target sensor based on the reference object obtained in operation 314 and the extrinsic parameter estimated for the other sensor based on the reference object.

In operation 344, the electronic device may determine the second extrinsic parameter between the target sensor and the other sensor by integrating the extrinsic parameters of the plurality of frames. For example, in response to a common reference object being captured by the target sensor and the other sensor in consecutive frames, the electronic device may calculate a second candidate extrinsic parameter for each of at least a portion of the frames. The electronic device may remove an outlier value from the plurality of second candidate extrinsic parameters, and determine an average value of the remaining second candidate extrinsic parameters as the second extrinsic parameter.

Then, in operation 350, the electronic device may perform coordinate conversion using the first extrinsic parameter and/or the second extrinsic parameter. For example, the electronic device may convert coordinate information according to the ground coordinate system into coordinate information according to an image coordinate system (for example, a pixel coordinate system) and/or the sensor coordinate system of the target sensor using the first extrinsic parameter. As another example, the electronic device may convert the coordinate information according to the image coordinate system and/or the sensor coordinate system of the target sensor into coordinate information according to an image coordinate system and/or the sensor coordinate system of the other sensor using the second extrinsic parameter.

For example, in operation 350, the electronic device may convert the position of an object outside (for example, a pedestrian and/or another vehicle in an area outside the electronic device) detected through the target sensor into coordinates that are based on the ground coordinate system. In operation 350, the electronic device may control at least a portion of operations of the electronic device based on a positional relationship (for example, the distance) between the object outside and the electronic device based on the coordinates obtained by conversion. When the electronic device is implemented as a vehicle, as described above, the electronic device may perform any one or any combination of any two or more of accelerating, braking, and steering the vehicle based on the distance between the object outside and the electronic device calculated using the coordinates obtained by conversion using the first extrinsic parameter and/or the second extrinsic parameter.

As another example, in operation 350, the electronic device may generate a homographic image by stitching sensing data collected through the plurality of sensors including the target sensor and the other sensor. However, examples are not limited thereto, and the electronic device may combine sensing data (for example, images) collected by each sensor with sensing data (for example, images) collected by one or more other sensors using the first extrinsic parameter and/or the second extrinsic parameter. The electronic device may output, through a display, a composite image (for example, a surround image of the vehicle) generated by combining the images using the first extrinsic parameter and/or the second extrinsic parameter.

Figure 4:
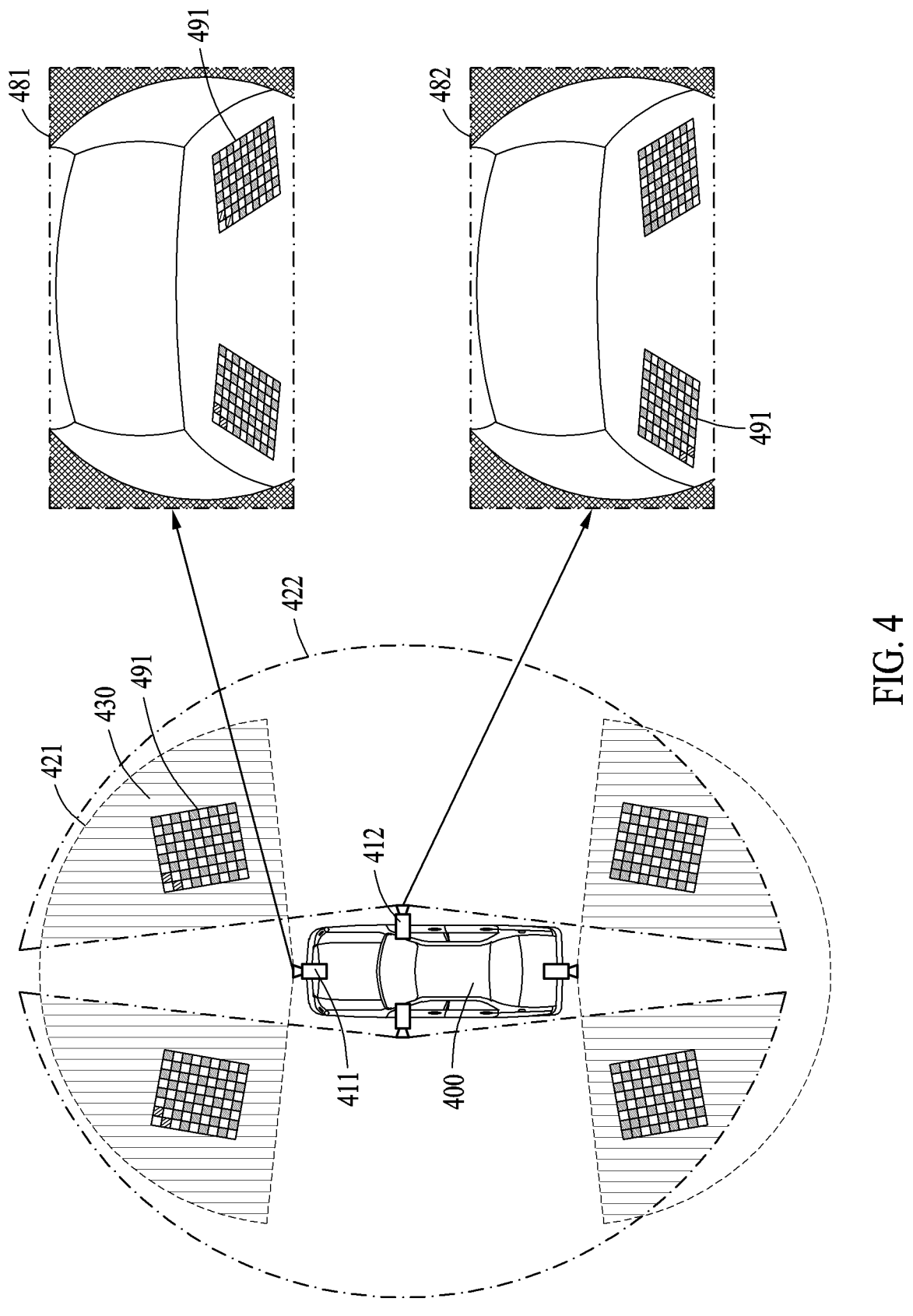
FIG. 4 illustrates an example of arranging sensors and capturing a reference object.

FIG. 4 illustrates an example of arranging sensors and capturing a reference object.

An electronic device 400 may capture scenes through a plurality of sensors. The plurality of sensors may each capture a different scene according to a field of view of each sensor and the arrangement in which the corresponding sensor is mounted. Each of the plurality of sensors may be arranged to have a field of view that overlaps a field of view of at least one other sensor. Sensors having overlapping fields of view may capture partially overlapping scenes within a range corresponding to the overlapping fields of view. For example, as shown in FIG. 4, the sensing range of a target sensor 411 (for example, front camera sensor) may partially overlap the sensing range of another sensor 412 (for example, right camera sensor). The sensing range of each sensor may be determined based on the field of view, the orientation of a principal axis of the sensor, and the maximum sensing range of the sensor (for example, the visibility range in the case of a camera sensor). Sensing data 481 captured through the target sensor 411 may include a reference object 491, and sensing data 482 captured through the other sensor 412 may also include the reference object 491. In other words, FIG. 4 shows an example of the common reference object 491 being captured by the target sensor 411 and the other sensor 412.

For reference, the range of fields of view of the plurality of sensors (for example, including the target sensor) may include a longitudinal axis of a ground coordinate system set for the electronic device. Among the plurality of sensors, sensors (for example, left and right camera sensors) arranged on lateral sides (for example, left and right sides) of the electronic device may be arranged and designed such that the longitudinal axis of the ground coordinate system may be within their fields of view for FOE calculation, a non-limiting example of which will be further described later with reference to FIG. 7. For example, the lateral sensors may have wide fields of view of 180 degrees or greater, or may be aligned such that at least a portion of the fields of view includes the longitudinal axis.

The plurality of sensors may generate sensing data by capturing corresponding scenes. A processor (e.g., one or more processors) of the electronic device 400 may extract reference points from the sensing data by analyzing the sensing data. A reference point may be a point serving as a reference for pattern identification and sensor calibration in sensing data. For example, when the plurality of sensors include camera sensors, the processor may detect corner points as the reference points from image data generated through the camera sensors. A corner point may be an intersection point of two or more edges, and may be a point at which two or more different edge orientations exist in the vicinity. The processor may detect the corner points using a corner detection operator (for example, the Harris corner detector).

The electronic device 400 may identify the plurality of corner points as the reference points from the sensing data. The electronic device 400 may determine whether the reference object 491 exists or is present based on the plurality of identified corner points. For example, the electronic device 400 may determine whether the reference object 491 having a pattern is included in the sensing data through the corner points. The electronic device 400 may perform operation 314 described above with reference to FIG. 3, in response to the reference object 491 being detected in the sensing data 481 captured through the target sensor 411. In addition, in response to the reference object 491 common to that detected by the target sensor 411 being detected in the sensing data 482 captured through the other sensor 412, the electronic device 400 may perform operation 340 described above with reference to FIG. 3. In response to the reference object 491 being detected in a region 430 in which a sensing region 421 of the target sensor 411 and a sensing region 422 of the other sensor 412 overlap, the electronic device 400 may determine that the common reference object 491 is captured by the target sensor 411 and the other sensor 412.

Figure 5A:
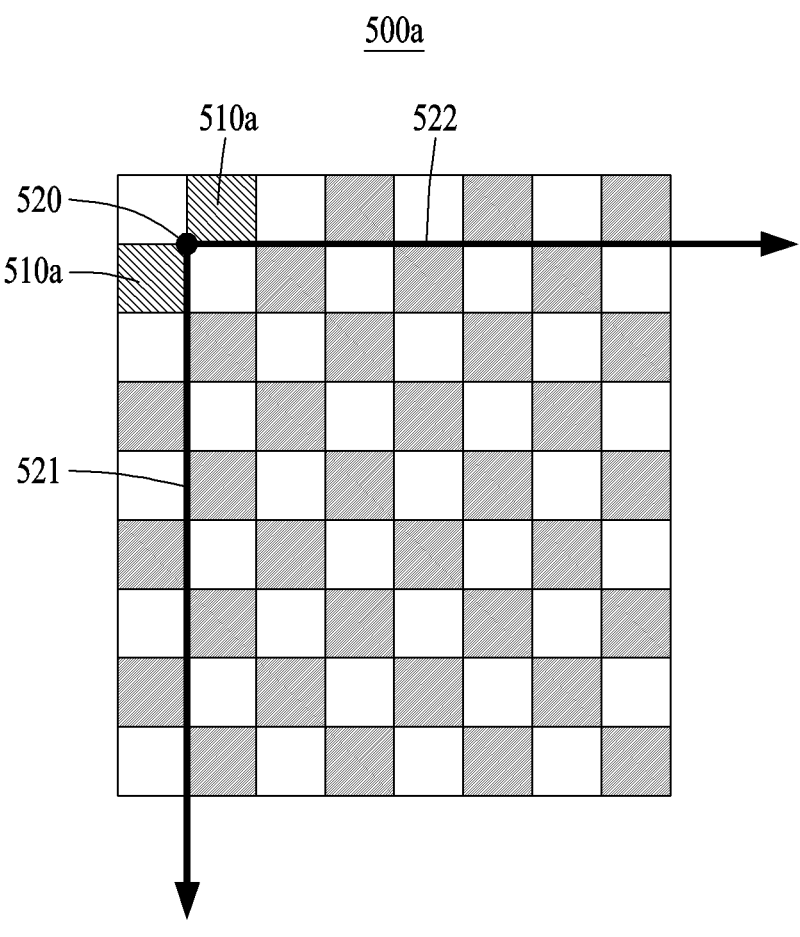
FIGS. 5A and 5B illustrate an example of a reference object.
Figure 5B:
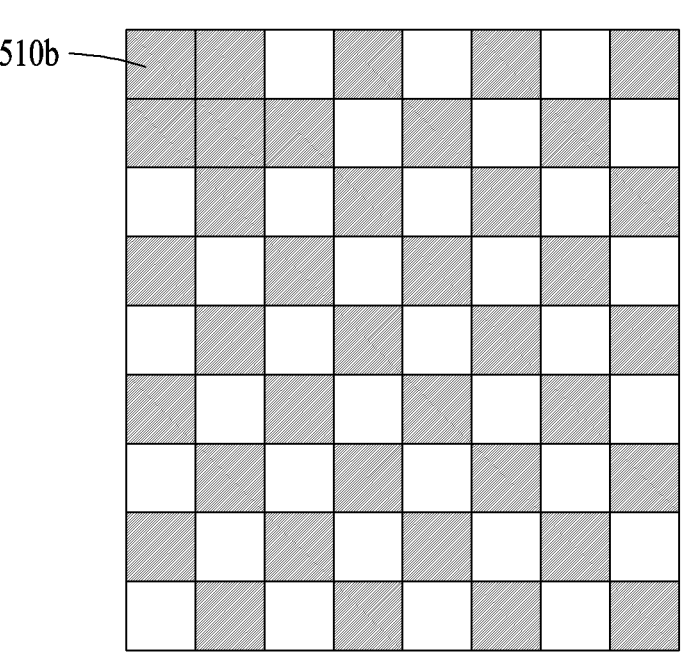

FIGS. 5A and 5B illustrate an example of a reference object.

A reference object may be an object set as a reference for calibration, and may be, for example, an object having a pattern. The reference object may be an object having a reference marking. The reference marking may be a marking indicating an orientation of the reference object with respect to a center point of the reference object. For example, FIGS. 5A and 5B show reference objects having a grid (for example, chessboard-like) pattern. Of the spaces defined by the grids in the reference objects, some spaces corresponding to the reference marking have different colors and/or arrangements.

In FIG. 5A, a first reference marking of a first reference object 500a may be spaces 510a that are at an upper left corner and in a different color from the remaining portion of the pattern. In FIG. 5B, a second reference marking of a second reference object 500b may be spaces 510b that are at an upper left corner in a different pattern from the remaining portion of the pattern. As described above, when the reference object has the reference marking, an electronic device may identify the reference marking from the reference object identified from sensing data generated through a target sensor.

The electronic device may determine the orientation of the reference object based on the reference marking. For example, the electronic device may obtain information related to coordinates (for example, "default coordinate information") of reference points according to a world coordinate system defined based on the reference marking (for example, "reference world coordinate system"), wherein the reference points according to the reference world coordinate system may be, for example, corner points according to the pattern of the reference object. A non-limiting example of calibration using default coordinate information will be further described below with reference to FIG. 6. The origin 520 of the reference world coordinate system may be defined based on the reference markings 510a and 510b, as described above. In the example of FIG. 5A, an intersection point between spaces having a different color from the remaining portion of the reference marking 510a may be defined as the origin 520. The reference world coordinate system shown in FIG. 5A may include, based on the origin 520, an axis 521, an axis 522 perpendicular to the axis 521, and a vertical axis perpendicular to a plane on which the reference object is disposed. As described above, the plane on which the reference object is disposed may be parallel to the ground.

Herein, a reference object is mainly described as a grid pattern having a reference marking. However, examples are not limited thereto, and the reference object may have any two-dimensional planar figure and/or a pattern (for example, may have a shape such as a quick response (QR) code), or the reference object may have any three-dimensional stereoscopic pattern for a sensor that detects depth and/or distance (for example, a radar sensor, an ultrasonic sensor, and/or a lidar sensor), according to other non-limiting examples. In this case, reference points in a reference object having a three-dimensional pattern may be defined to be positioned on a plane parallel to the ground. For reference, an example in which reference objects disposed in the same physical space have the same pattern has been described herein. However, examples are not limited thereto, and at least one of a plurality of reference objects may have a pattern different from that of the other reference objects, or the plurality of reference objects may respectively have different patterns, according to other non-limiting examples.

The electronic device may estimate a portion of a rotation parameter based on the orientation determined with respect to the reference object. A non-limiting example of calibration using the reference world coordinate system defined based on the determined orientation of the reference object will be further described below with reference to FIG. 6.

Figure 6:
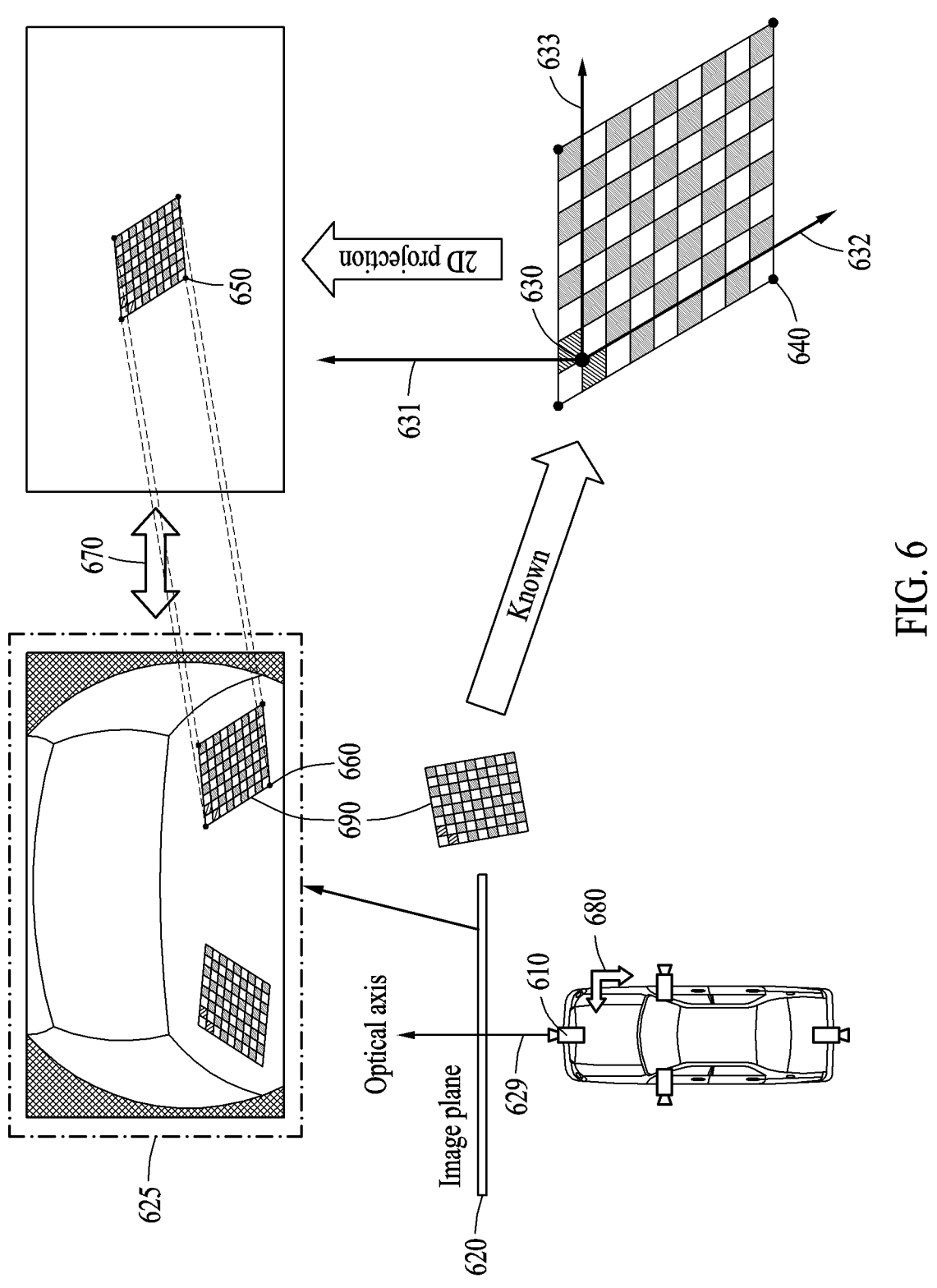
FIG. 6 illustrates an example of calibration of a target sensor based on a capture of a reference object.

FIG. 6 illustrates an example of calibration of a target sensor based on a capture of a reference object.

An electronic device may perform calibration between a target sensor 610 and a captured reference object 690 using a reference world coordinate system defined based on a determined orientation of the reference object 690. For example, the electronic device may estimate an extrinsic parameter indicating a coordinate conversion relationship between the reference world coordinate system and a sensor coordinate system of the target sensor 610, according to operation 314 described above with reference to FIG. 3. In the sensor coordinate system (for example, a camera coordinate system), a principal axis 629 (for example, an optical axis) of the target sensor 610 may be defined by a vertical axis (for example, Zc axis) and axes orthogonal to the principal axis 629 (for example, Xc axis and Yc axis). Similar to the description of FIG. 5A, the reference world coordinate system may be defined by a vertical axis 631 (for example, Z axis) and axes 632 and 633 orthogonal to the vertical axis (for example, X axis and Y axis) based on an origin 630 defined based on a reference marking in the reference object 690. The principal axis 629 may be a central axis of a field of view of the target sensor 610, and may be, in the case of a camera sensor, an axis perpendicular to an image plane 620. The principal axis 629 may also be referred to as an optical axis. In FIG. 6, an image corresponding to the image plane 620 is shown as sensing data 625.

For example, the electronic device may obtain default coordinate information 640 according to a world coordinate system that is based on a reference marking (for example, reference world coordinate system) for the plurality of reference points of the reference object 690. The default coordinate information 640 may include default coordinates of the reference points based on the origin 630. The default coordinates of the reference points may be coordinates represented in the reference world coordinate system based on an interval between the reference points given according to a predefined pattern of the reference object 690. The electronic device may obtain the default coordinate information 640 by calculating or determine the default coordinate information 640 based on the shape and/or interval of a pattern given or determined in advance, or by loading the default coordinate information 640 pre-stored in memory.

The electronic device may estimate a portion (for example, a rolling component and a pitch component) of the rotation parameter based on coordinate information 660 detected for the plurality of reference points in the sensing data 625 and coordinate information 650 obtained by projecting the default coordinate information 640 in the image coordinate system based on the determined orientation.

For example, the electronic device may match default coordinates of a corresponding reference point to coordinates (for example, image coordinates) according to the sensing data 625 of each of the reference points detected by the target sensor 610. For example, the electronic device may determine pairs 670 of image coordinates and corresponding default coordinates for each reference point, based on the orientation determined with respect to the reference object 690. The image coordinates of the reference point may be coordinates according to the image coordinate system of the target sensor 610, and the default coordinates of the reference point may be coordinates according to a reference world coordinate system defined based on a reference marking of the reference object 690.

The electronic device may project three-dimensional default coordinates in two dimensions. For example, the electronic device may project the default coordinates according to the reference world coordinate system in the image coordinate system. The electronic device may determine an extrinsic parameter that minimizes an error between the image coordinates and the coordinates obtained by projecting the default coordinates of the reference points (for example, reduces the error below a threshold). For example, the electronic device may determine the above-described extrinsic parameter using a Levenberg-Marquardt (LM) optimization algorithm, an efficient perspective-n-point camera pose estimation (EPnP) algorithm, and/or a sequential quadratic PNP (SQPnP) algorithm.

Here, an extrinsic parameter between the target sensor 610 (for example, the front camera sensor) and the reference object 690 (for example, the first pattern) may be expressed as in Equation 1 below, for example.

$$T_{C_FP_1} = \begin{bmatrix} r_1 & r_2 & r_3 & t_X \\ r_4 & r_5 & r_6 & t_Y \\ r_7 & r_8 & r_9 & t_Z \\ 0 & 0 & 0 & 1 \end{bmatrix} \qquad \text{Equation 1}$$

In Equation 1, the extrinsic parameter $T_{C_FP_1}$ is a 4×4 matrix, which may include rotation components and translation components. $r_1$ to $r_9$ denote the rotation component, and $t_X$, $t_Y$, and $t_Z$ respectively denote an X-axial translation component, a Y-axial translation component, and a Z-axial translation component. The extrinsic parameter $T_{C_FP_1}$ may be expressed as decomposed into a rotation parameter $R_{C_FP_1}$ expressed in Equation 2 below, for example, and a translation parameter $t_{C_FP_1}$ expressed in Equation 3 below, for example.

$$R_{C_FP_1} = \begin{bmatrix} r_1 & r_2 & r_3 \\ r_4 & r_5 & r_6 \\ r_7 & r_8 & r_9 \end{bmatrix} \qquad \text{Equation 2}$$

$$t_{C_FP_1} = \begin{bmatrix} t_X \\ t_Y \\ t_Z \end{bmatrix} \qquad \text{Equation 3}$$

In Equation 2, the rotation parameter $R_{C_FP_1}$ indicating the rotation parameters, of the coordinate conversion relationship between the sensor coordinate system of the target sensor 610 and the reference world coordinate system, may be decomposed as in Equation 4 below, for example.

$$R_{C_FP_1} = R_{Roll} \cdot R_{Pitch} \cdot R_{Yaw} = \qquad \text{Equation 4}$$

$$\begin{bmatrix} \cos(r) & -\sin(r) & 0 \\ \sin(r) & \cos(r) & 0 \\ 0 & 0 & 1 \end{bmatrix} \begin{bmatrix} 1 & 0 & 0 \\ 0 & \cos(p) & -\sin(p) \\ 0 & \sin(p) & \cos(p) \end{bmatrix} \begin{bmatrix} \cos(y) & -\sin(y) & 0 \\ \sin(y) & \cos(y) & 0 \\ 0 & 0 & 1 \end{bmatrix}$$

In Equation 4, r denotes a rolling angle, p denotes a pitch angle, and y denotes a yaw angle. The matrices of Equation 4 may represent rolling components, pitch components, and yaw components in that order. Although a non-limiting example will be described later in FIG. 7, the rolling components and the pitch components obtained as in Equation 4 above may be determined to be rolling components and pitch components between the sensor coordinate system and the reference world coordinate system. That is, when the plane on which the reference object 690 is disposed is parallel to the ground, the rolling components and the pitch components with respect to the reference object 690 based on the target sensor 610 may be the same as the rolling components and the pitch components with respect to the ground based on the target sensor 610.

Accordingly, by estimating a rotational relationship between the reference world coordinate system corresponding to the reference object 690 and the sensor coordinate system of the target sensor 610 through the reference marking as described above, the electronic device of one or more embodiments may improve the technological fields of sensor calibration, SVM camera calibration, and SVM systems by accurately performing calibration without determining or using a precise position and angle arrangement between patterns and a precise position and angle arrangement between the patterns and the electronic device, as opposed typical electronic devices which may perform calibration by determining or using such precise arrangements.

In addition, in response to a common reference object 690 being identified from both the sensing data 625 captured by two different sensors of the plurality of sensors, the electronic device may perform calibration of a second extrinsic parameter between the two different sensors. For example, in response to the common reference object 690 being detected by the target sensor 610 and another sensor, the electronic device may also perform inter-camera calibration 680 according to operation 340 as described above with reference to FIG. 3. Here, the electronic device may use sensing data 625 of the same frame, among consecutive frames, for the sensing data 625 of the target sensor 610 and the sensing data 625 of the other sensor. However, examples are not limited thereto, and even when a frame difference between the sensing data 625 obtained by capturing the reference object 690 by two sensors is less than a threshold frame, the inter-camera calibration 680 according to operation 340 may be performed.

For example, according to operation 342 of FIG. 3, the electronic device may estimate, for the other sensor as well, an extrinsic parameter indicating a coordinate conversion relationship between the reference world coordinate system of the reference object 690 and the sensor coordinate system of the other sensor, similar to Equations 1 to 4 described above. Accordingly, as shown in FIG. 6, the electronic device may obtain an extrinsic parameter $T_{C_F P_1}$ between the reference object 690 and the front camera sensor and an extrinsic parameter $T_{C_R P_1}$ between the reference object 690 and the right camera sensor, using the common reference object 690.

The electronic device may determine a second extrinsic parameter $T_{C_F C_R}$ between two different sensors (that is, the target sensor 610 and the other sensor) using an extrinsic parameter $T_{C_F P_1}$ between the reference object 690 and the target sensor 610 and an extrinsic parameter $T_{C_R P_1}$ between the reference object 690 and the other sensor. For example, the electronic device may determine the second extrinsic parameter $T_{C_F C_R}$ between the target sensor 610 and the other sensor according to Equation 5 below, for example.

$$T_{C_F C_R} = T_{C_F P_1} \cdot T_{P_1 C_R} = T_{C_F P_1} \cdot (T_{C_R P_1})^{-1} \qquad \text{Equation 5}$$

As shown in Equation 5, the electronic device may obtain the second extrinsic parameter $T_{C_F C_R}$ through a matrix multiplication of an inverse matrix of the extrinsic parameter $T_{C_F P_1}$ between the reference object 690 and the target sensor 610 and an inverse matrix of the extrinsic parameter $T_{C_R P_1}$ between the reference object 690 and the other sensor. The electronic device may repeat an operation similar to Equation 5 for a combination between the plurality of sensors, thereby obtaining a second extrinsic parameter $T_{C_R C_B}$ between the right camera sensor and a rear camera sensor, a second extrinsic parameter $T_{C_B C_L}$ between the rear camera sensor and a left camera sensor, and a second extrinsic parameter $T_{C_L C_F}$ between the left camera sensor and the front camera sensor. The second extrinsic parameters obtained as described above may be utilized for coordinate conversion between sensors (for example, cameras). For example, the electronic device may generate a surround image or a rear image by combining sensing data 625 (for example, image data) obtained by different sensors.

Hereinafter, non-limiting examples of estimation of the remaining components of the first extrinsic parameter between the ground coordinate system and the target sensor 610 will be further described.

Figure 7:
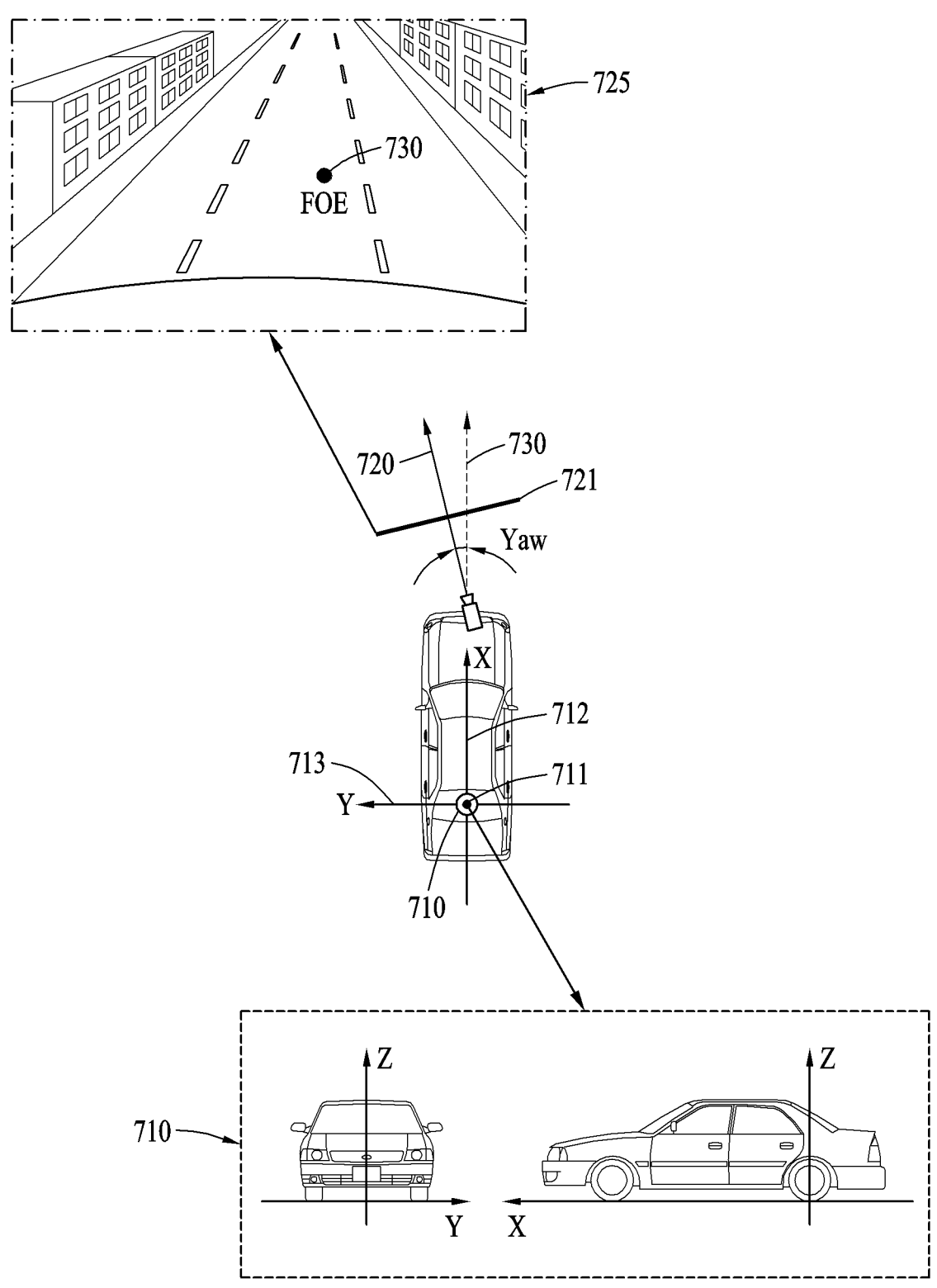
FIG. 7 illustrates an example of calibration of a target sensor that is based on a ground coordinate system.

FIG. 7 illustrates an example of calibration of a target sensor that is based on a ground coordinate system.

An electronic device may estimate a first extrinsic parameter between a ground coordinate system 710 and a target sensor according to operation 321 described above with reference to FIG. 3. The ground coordinate system 710 may be a world coordinate system defined based on the electronic device, and a plane corresponding to its two axes (for example, X axis and Y axis) may be parallel to the ground. A vertical axis 711 (for example, Z axis) of the ground coordinate system 710 may be perpendicular to the ground. In the example shown in FIG. 7, the origin of the ground coordinate system 710 may be defined as a point where the center of the rear wheel axis of the electronic device implemented as a vehicle contacts the ground. The ground may be a plane with Z=0. The X axis of the ground coordinate system 710 may be a longitudinal axis 712 of the electronic device (for example, vehicle), and the Y axis thereof may be a lateral axis 713. When the ground coordinate system 710 is defined as Ground (G), the first extrinsic parameter between the target sensor (for example, front camera sensor) and the ground coordinate system 710 may include a rotation parameter $R_{C_F G}$ and a translation parameter $t_{C_F G}$. Here, the rotation parameter $R_{C_F G}$ may be expressed as decomposed into a rolling component, a pitch component, and a yaw component as shown in Equation 6 below, for example.

$$R_{C_F G} = R_{roll} \cdot R_{pitch} \cdot R_{yaw} = \qquad \text{Equation 6}$$

$$\begin{bmatrix} \cos(r) & -\sin(r) & 0 \\ \sin(r) & \cos(r) & 0 \\ 0 & 0 & 1 \end{bmatrix} \begin{bmatrix} 1 & 0 & 0 \\ 0 & \cos(p) & -\sin(p) \\ 0 & \sin(p) & \cos(p) \end{bmatrix} \begin{bmatrix} \cos(y) & -\sin(y) & 0 \\ \sin(y) & \cos(y) & 0 \\ 0 & 0 & 1 \end{bmatrix}$$

In Equation 6, $R_{roll}$ denotes the rolling component of the rotation parameter $R_{C_F G}$, $R_{pitch}$ denotes the pitch component of the rotation parameter $R_{C_F G}$, and $R_{yaw}$ denotes the yaw component of the rotation parameter $R_{C_F G}$. In Equation 6, matrices corresponding to the rolling component $R_{roll}$, the pitch component $R_{pitch}$, and the yaw component $R_{yaw}$ are sequentially expressed. As described above, the X-Y plane of the ground coordinate system 710 may be parallel to an X-Y plane of a reference world coordinate system based on a reference object. Accordingly, the rolling component and the pitch component of the target sensor relative to the ground coordinate system 710 may be the same as the rolling component and the pitch component of the target sensor relative to the reference world coordinate system estimated in FIG. 6. In other words, the electronic device may determine the rolling component $R_{roll}$ and the pitch component $R_{pitch}$ of the rotation parameter of the first extrinsic parameter to be the rolling component and the pitch component of the rotation parameter $R_{C_PP_1}$ indicating rotation components of a coordinate conversion relationship between the reference world coordinate system and a sensor coordinate system of the target sensor estimated in Equation 4 above.

Further, the electronic device may determine a yaw component of the rotation parameter of the first extrinsic parameter. The electronic device may collect sensing data 725 with consecutive frames while rectilinearly moving (for example, moving forward or moving backward) along one axis (for example, the longitudinal axis 712) of the ground coordinate system 710. The sensing data 725 may be data collected by a sensor, such as image data collected by a camera sensor. However, examples are not limited thereto, and the sensing data 725 may be depth map data collected by an infrared sensor, a lidar sensor, an ultrasonic sensor, and/or a radar sensor, according to other non-limiting examples. The electronic device may calculate an FOE 730 based on the sensing data 725 collected with consecutive frames by the target sensor while the electronic device rectilinearly moves along one axis of the ground coordinate system 710. The FOE 730 may be a point at which an optical flow converges in consecutive frame images. As described above, the FOE 730 may be calculated based on the optical flow in the consecutive frame images collected while the electronic device rectilinearly moves along one axis (for example, the longitudinal axis 712) of the ground coordinate system 710. Thus, a direction toward the FOE 730 appearing in the sensing data 725 corresponding to an image plane 721 may be the same as the longitudinal axis 712 of the ground coordinate system 710, e.g., when the direction of rectilinear movement of the electronic device (for example, vehicle) is defined to coincide with the longitudinal axis 712 of the ground coordinate system 710. Accordingly, the electronic device may determine a yaw component between the target sensor and the ground coordinate system 710 based on an angle difference between the direction toward the FOE 730 and a principal axis 720 of the target sensor in the image plane 721.

The electronic device may estimate the above-described yaw component using a principal point and a focus of an intrinsic parameter of the target sensor together with the FOE 730. The principal point may be a point through which the principal axis 720 passes in the image plane. For example, the electronic device may determine pixel coordinates corresponding to the FOE 730 in the image plane based on the optical flow calculated from the consecutive frames. The electronic device may calculate a distance (for example, pixel distance) between pixel coordinates corresponding to the FOE 730 and pixel coordinates corresponding to the principal point on the image plane. The electronic device may determine an angular difference between the principal axis 720 and the direction toward the FOE 730 based on a pixel distance between the FOE 730 and the principal point and the focal length of the target sensor. For example, the electronic device may calculate the angular difference between the principal axis 720 and the direction toward the FOE 730 in arctan (pixel distance/focal length), and determine the calculated angular difference to be the yaw component. Here, the focal length may be a distance in pixels, which is a relative value with respect to a cell size of the target sensor, and may be a relative size (for example, a multiple) of the focal length relative to the cell size in the direction in which the FOE 730 exists based on the principal point. The focal length may be, for example, $f_x$ of the intrinsic parameter of the target sensor. A cell may be a sensing element (for example, photodiode) of the target sensor (for example, image sensor). $f_x$ may be a relative size (for example, a multiple) of the focal length relative to a horizontal cell size. However, examples are not limited thereto. According to the pitch component and the rolling component of the target sensor, the focal length of the target sensor may be determined based on $f_x$ and $f_y$ of the intrinsic parameter. $f_y$ may be a relative size (for example, a multiple) of the focal length relative to a vertical cell size.

Accordingly, the electronic device may determine the rotation parameter of the first extrinsic parameter by combining the rolling component and the pitch component estimated in the example of FIG. 6 and the yaw component estimated in the example of FIG. 7. For reference, the frames of the sensing data used to estimate the rolling component and the pitch component and the frames of the sensing data used to estimate the yaw component may differ in time. In other words, the operation of estimating the rolling component and the pitch component according to the example of FIG. 6 and the operation of estimating the yaw component according to the example of FIG. 7 may be performed at different timings.

Figure 8:
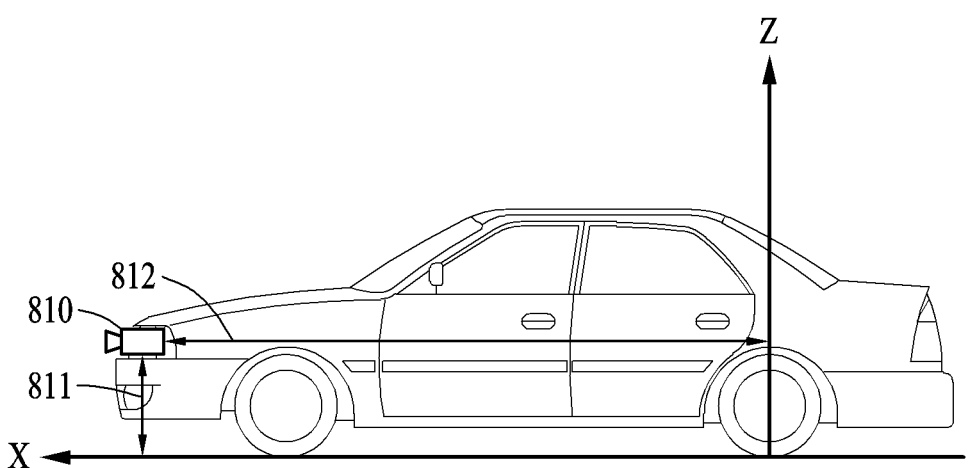
FIG. 8 illustrates an example of calibration of a target sensor using dimension data.

FIG. 8 illustrates an example of calibration of a target sensor using dimension data.

As described above in operation 331 of FIG. 3, an electronic device may determine a translation parameter of a first extrinsic parameter. For example, the electronic device may determine a translation component in the first extrinsic parameter based on dimension data indicating a positional relationship in which a target sensor is disposed in the electronic device. The dimension data may include dimensions related to positions of sensors installed in the electronic device (for example, vehicle). For example, the dimension data may include a height 811 from the ground to each sensor 810, a distance 812 from a vertical axis to each sensor 810, a distance from a longitudinal axis to each sensor 810, and a distance from a lateral axis to each sensor 810. The electronic device may determine a translation component of each sensor 810 using a height and/or distance from the ground and/or each axis to the corresponding sensor 810 obtained from the dimension data.

However, examples are not limited thereto. A value of a portion of the translation component may be estimated. The electronic device may determine a height component of the translation component in the first extrinsic parameter based on either one or both of a translation component between a reference object obtained according to a capture of the reference object and the target sensor and the dimension data with respect to the target sensor.

For example, the electronic device may determine the height value of the translation component obtained in FIG. 6 to be the height value (for example, Z-axial translation component) of the target sensor with respect to the ground coordinate system through calibration between the reference object and the target sensor. This is because the height in the reference world coordinate system and the height in the ground coordinate system are the same. In this case, the X-axial translation component and the Y-axial translation component may indicate a position of a camera sensor in the vehicle on the plane parallel to the ground, and these values may be actually measured or obtained from the dimension data (for example, vehicle design data). When the electronic device is implemented as a vehicle, the height from the ground to the sensor may slightly vary according to a change in the air pressure of the wheels. Such variations may be corrected based on the height value obtained through calibration using the reference object.

As another example, dimension data may be given only for a portion of the plurality of sensors. In this case, the electronic device may further determine a translation component in a ground coordinate system of another sensor from the portion of the sensors for which the dimension data are given, using the second extrinsic parameter between sensors estimated in FIG. 6. For example, the electronic device may estimate the translation component of the other sensor using a translation parameter between sensors in the second extrinsic parameter.

The above-described operations have been described as examples of determining the first extrinsic parameter and the second extrinsic parameter in an individual frame, but examples are not limited thereto. As described above in operation 332 of FIG. 3, the electronic device may determine a final extrinsic parameter by calculating and integrating a plurality of candidate extrinsic parameters from a plurality of frames. For example, the electronic device may calculate a first candidate extrinsic parameter for each of at least a portion of the plurality of frames. The electronic device may determine a first extrinsic parameter by integrating the plurality of first candidate extrinsic parameters. For example, the electronic device may remove an outlier value from the plurality of first candidate extrinsic parameters and integrate the remaining values. For example, the electronic device may remove the outlier value from the plurality of first candidate extrinsic parameters through an outlier removal operation (for example, RANdom SAmple Consensus (RANSAC)). The electronic device may determine the first extrinsic parameter as an average value or a median value of the remaining values obtained by removing the outlier value. Similarly, the electronic device may determine a second extrinsic parameter by calculating and integrating a plurality of second candidate extrinsic parameters even in the calibration between the sensors. The accuracy of calibration may be improved through the integration of candidate extrinsic parameters.

In addition, although it has been described that the first extrinsic parameter and the second extrinsic parameter are estimated using sensing data of the same frame, examples are not limited thereto. The electronic device may estimate a first extrinsic parameter in one frame and terminate calibration, and then estimate a second extrinsic parameter in the next calibration. For example, the electronic device may estimate only a first extrinsic parameter in frames in which a reference object common between sensors is not detected, and may estimate a second extrinsic parameter as well in frames in which a common reference object is detected.

The electronic device may perform coordinate conversion between a coordinate system of the target sensor and the ground coordinate system using the first extrinsic parameter determined as described above. Exemplary operations of coordinate conversion using the first extrinsic parameter have been described above in operation 350 of FIG. 3, and thus a further description is omitted.

Figure 9:
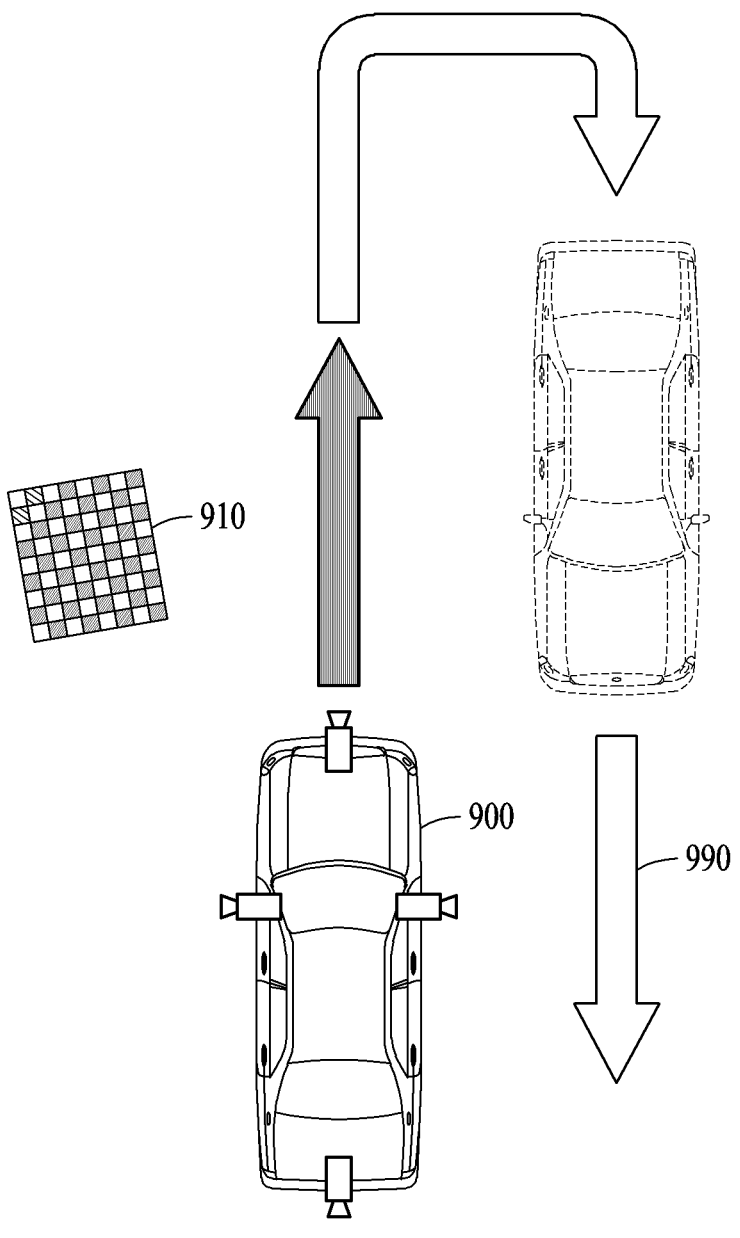
FIG. 9 illustrates an example of a driving path for calibration of a sensor with respect to a reference object.

FIG. 9 illustrates an example of a driving path for calibration of a sensor with respect to a reference object.

When the number of reference objects 910 is sufficient or determined to be sufficient (e.g., greater than or equal to a predetermined threshold), an electronic device 900 may perform calibration of all sensors even in a stationary state. For example, n sensors may be mounted on the electronic device 900, and n reference objects 910 may be disposed around the electronic device 900. Here, n may be an integer greater than or equal to "2". When the number of sensing regions overlapping among the n sensors is also n, and the n reference objects 910 are respectively disposed in the sensing regions, the electronic device 900 may perform calibration of all sensors in a stationary state. FIG. 1 shows an example of n=4.

When the number of reference objects 910 is insufficient or determined to be insufficient (e.g., less than the predetermined threshold), the electronic device 900 may move along a path 990 for calibration, according to the arrangement of the plurality of sensors, the regions in which fields of view overlap, the number of reference objects 910, and the arrangement of the reference objects 910. For example, two reference objects 910 may be disposed, and an interval between the reference objects 910 may exceed a width of the electronic device 900. In this case, the electronic device 900 may move through the space between the reference objects 910. The electronic device 900 may perform the calibrations described above with reference to FIGS. 1 to 8 by collecting sensing data with consecutive frames while rectilinearly moving between the reference objects 910. According to the order in which a reference object 910 is captured by the sensors in response to the movement of the electronic device 900, the timing of performing calibration of a portion of the plurality of sensors and the timing of performing calibration of another sensor may differ. For example, when the electronic device 900 moves straight, calibration of a front camera sensor and lateral camera sensors (for example, left and right camera sensors) may be performed first, and then calibration of the lateral camera sensors and a rear camera sensor may be performed.

FIG. 9 illustrates an example in which a reference object 910 is disposed only one side based on the electronic device 900. For example, a single reference object 910 may be disposed. In response to the reference object 910 being detected only by a sensor disposed on one side of the electronic device 900 among a plurality of sensors, the electronic device 900 may move to detect the reference object 910 by a sensor disposed on a side opposite to the one side based on the center of the electronic device 900. For example, in FIG. 9, the electronic device 900 may move straight, make a U-turn, and move straight along the path 990. In this example, the electronic device 900 may sequentially perform calibration of the front camera sensor and the left camera sensor, calibration of the left camera sensor and the rear camera sensor, calibration of the front camera sensor and the right camera sensor, and calibration of the right camera sensor and the rear camera sensor.

Figure 10:
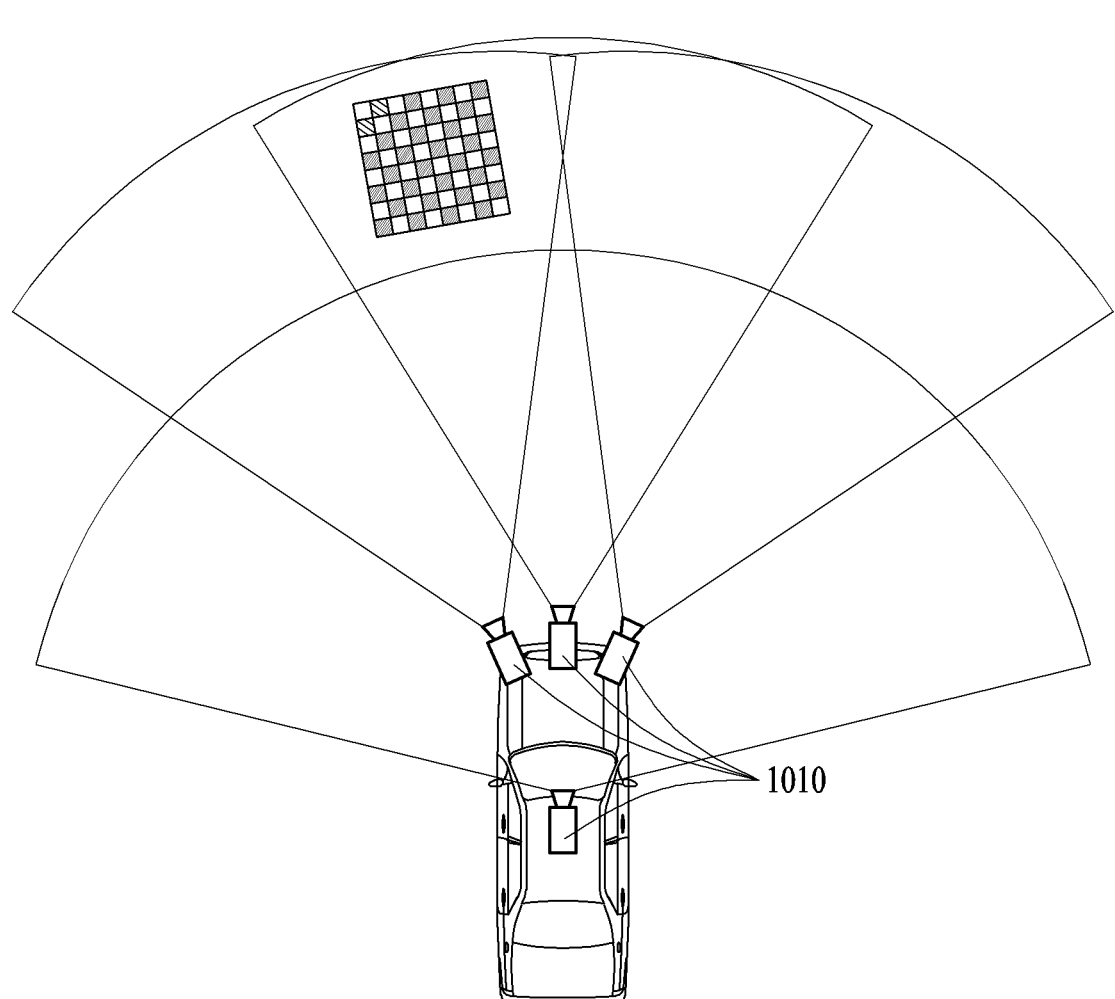
FIGS. 10 and 11 illustrate examples of arrangement of sensors.
Figure 11:
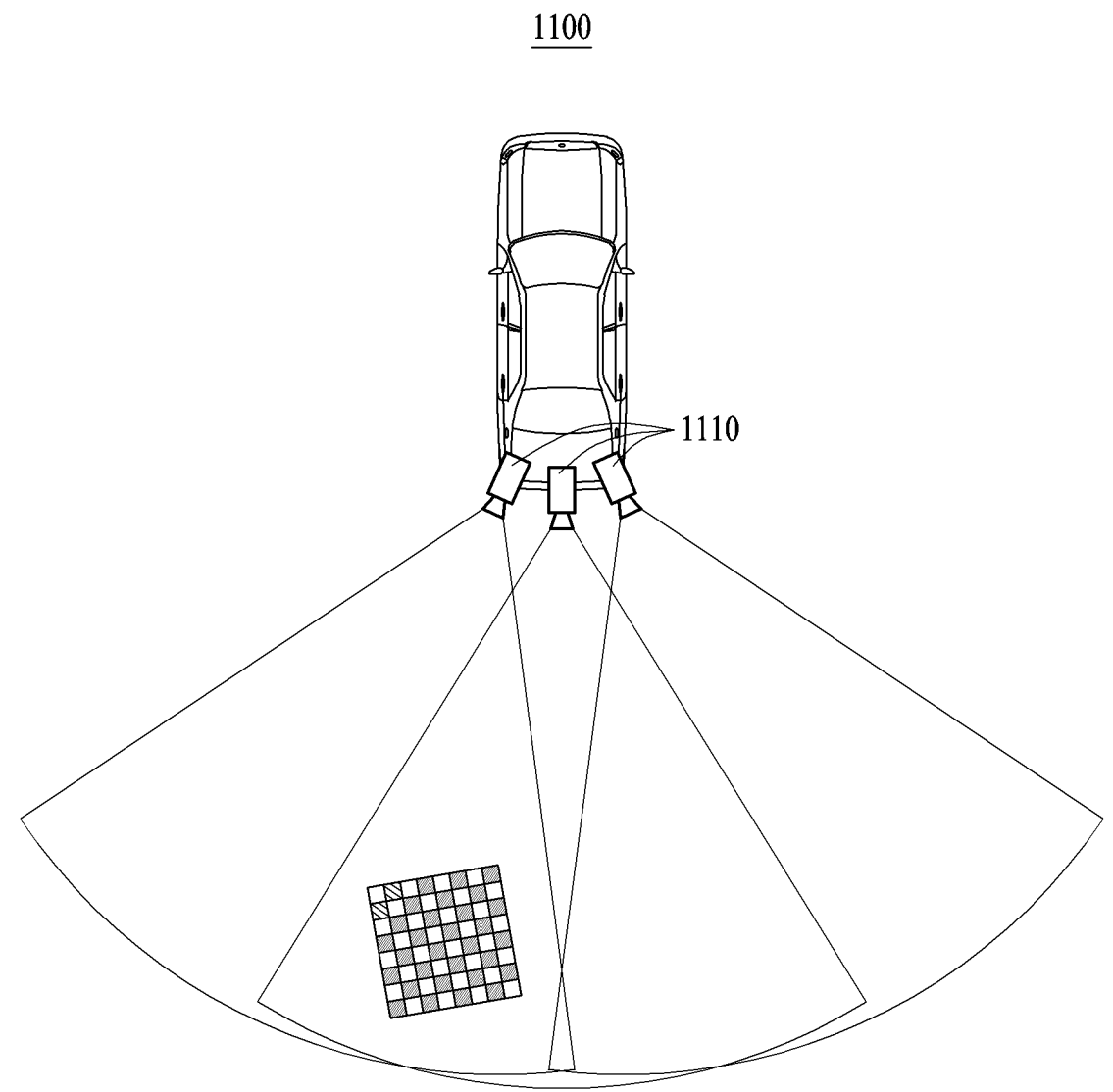

FIGS. 10 and 11 illustrate examples of arrangement of sensors.

FIG. 10 illustrates an electronic device 1000 in which a plurality of sensors 1010 facing the front of a vehicle are arranged for advanced driver assistance systems (ADASs). FIG. 11 illustrates an electronic device 1100 in which a plurality of sensors 1110 facing the rear of a vehicle are arranged for rearward sensing. The plurality of sensors 1010, 1110 may slightly differ in fields of view and direction of principal axes. A field of view of each of the plurality of sensors 1010, 1110 may overlap with a field of view of another sensor. As described above, the electronic device 1000, 1100 may perform calibration between a reference object and a sensor for estimating a first extrinsic parameter and calibration between sensors for estimating a second extrinsic parameter.

Figure 12:
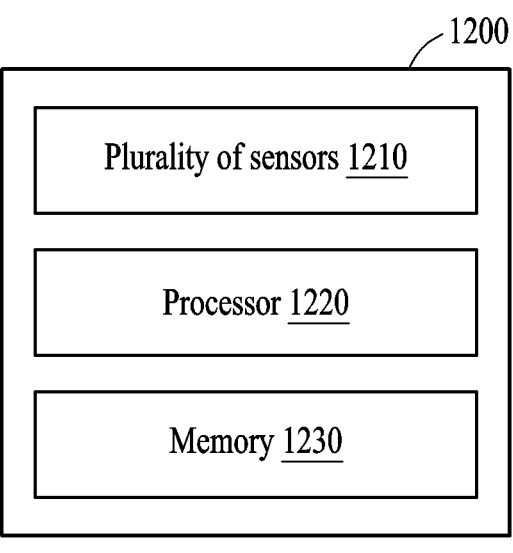
FIG. 12 illustrates an example of a configuration of an electronic device.

FIG. 12 illustrates an example of a configuration of an electronic device.

Referring to FIG. 12, an electronic device 1200 may include a plurality of sensors 1210, a processor 1220 (e.g., one or more processors), and a memory 1230 (e.g., one or more memories).

The plurality of sensors 1210 may each obtain sensing data based on a principal axis. The sensing data may be data obtained by capturing a scene corresponding to a field of view that is based on the principal axis. The plurality of sensors 1210 may include any one or any one or any combination of camera sensors, lidar sensors, infrared sensors, and ultrasonic sensors. Further, the plurality of sensors may include radar sensors. Herein, an example in which the plurality of sensors 1210 are camera sensors has been mainly described. However, examples are not limited thereto. The plurality of sensors 1210 may include heterogeneous sensors. For example, the electronic device 1200 may include a combination of a camera sensor and a lidar sensor. Each of the plurality of sensors 1210 may be individually arranged to have a field of view that overlaps a field of view of another sensor at least a part.

The processor 1220 may estimate a portion of a rotation parameter for a target sensor, among the plurality of sensors 1210, based on a capture of a reference object. The processor 1220 may estimate another portion of the rotation parameter for the target sensor based on a principal axis of the target sensor and an FOE calculated based on sensing data collected with consecutive frames by the target sensor while the electronic device 1200 rectilinearly moves based on one axis. The processor 1220 may determine a first extrinsic parameter for the target sensor based on the portion and the other portion of the rotation parameter. The processor 1220 may also determine a second extrinsic parameter between the cameras using an extrinsic parameter estimated based on the reference object for each sensor. However, operations of the processor 1220 are not limited to the foregoing, and the processor 1220 may perform any one or more or all of the operations and methods described above with reference to FIGS. 1 through 11.

The memory 1230 may temporarily or permanently store data for sensor calibration. For example, the memory 1230 may store sensing data collected by each sensor and estimated extrinsic parameters (for example, first and second extrinsic parameters).

Herein, an example of the electronic device 1200 implemented as a surround view monitor (SVM) system has been described for convenience of description. However, examples are not limited thereto. The electronic device 1200 may be mounted on one of a vehicle, a drone, and a drivable robot with multiple sensors (for example, ADAS, autonomous driving, and rear view camera).

The electronic devices, sensors, target sensors, other sensors, processors, memories, electronic device 100, sensors 110, electronic device 400, target sensor 411, other sensor 412, sensor 810, electronic device 900, electronic device 1000, sensors 1010, electronic device 1100, sensors 1110, electronic device 1200, sensors 1210, processor 1220, memory 1230, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with sensor calibration, the method comprising:

estimating a portion of a rotation parameter for a target sensor among a plurality of sensors based on a capture of a reference object;

estimating another portion of the rotation parameter for the target sensor based on an intrinsic parameter of the target sensor and a focus of expansion (FOE), the FOE being a point at which an optical flow converges in consecutive frame images, the another portion being determined based on sensing data collected with consecutive frames by the target sensor while an electronic device rectilinearly moves based on one axis; and performing calibration by determining a first extrinsic parameter for the target sensor based on the portion and the another portion of the rotation parameter, wherein the determining of the first extrinsic parameter comprises:

determining first candidate extrinsic parameters respectively for at least a portion of a plurality of frames; and determining the first extrinsic parameter by integrating the first candidate extrinsic parameters, wherein the determining of the first extrinsic parameter comprises removing an outlier value from the first candidate extrinsic parameters and integrating the remaining values.

2. The method of claim 1, wherein the estimating of the portion of the rotation parameter comprises:

identifying a plurality of corner points from the sensing data as reference points; and determining whether the reference object is in the capture based on the plurality of identified corner points.

3. The method of claim 1, wherein the estimating of the portion of the rotation parameter comprises:

identifying a reference marking from the reference object identified from sensing data generated through the target sensor;

determining an orientation of the reference object based on the reference marking; and estimating the portion of the rotation parameter based on the determined orientation.

4. The method of claim 3, wherein the estimating of the portion of the rotation parameter based on the determined orientation comprises:

determining default coordinate information according to a world coordinate system that is based on the reference marking for a plurality of reference points of the reference object; and estimating the portion of the rotation parameter based on coordinate information determined by projecting the default coordinate information to an image coordinate system based on the determined orientation and coordinate information detected for the plurality of reference points in the sensing data.

5. The method of claim 1, wherein the estimating of the portion of the rotation parameter comprises determining either one or both of a rolling component and a pitch component of the rotation parameter.

6. The method of claim 1, wherein the estimating of the another portion of the rotation parameter comprises determining a yaw component of the rotation parameter in the first extrinsic parameter.

7. The method of claim 1, further comprising:

determining a translation component in the first extrinsic parameter based on dimension data indicating a positional relationship in which the target sensor is disposed in the electronic device.

8. The method of claim 1, further comprising:

determining a height component of a translation component in the first extrinsic parameter based on either one or both of dimension data for the target sensor and a translation component between the reference object and the target sensor determined according to the capture of the reference object.

9. The method of claim 1, further comprising:

performing coordinate conversion between a coordinate system of the target sensor and a ground coordinate system, using the determined first extrinsic parameter.

10. The method of claim 1, further comprising:

performing calibration of a second extrinsic parameter between two different sensors, in response to a common reference object being identified at the same time from sensing data captured by the two different sensors among the plurality of sensors.

11. The method of claim 10, wherein the performing of the calibration of the second extrinsic parameter comprises determining, by the two different sensors, the second extrinsic parameter between the target sensor and another sensor using an extrinsic parameter between the reference object and the target sensor and an extrinsic parameter between the reference object and the another sensor.

12. The method of claim 10, further comprising:

performing coordinate conversion between a coordinate system of the target sensor and a coordinate system of another sensor, using the determined second extrinsic parameter.

13. The method of claim 1, wherein, in response to only a sensor disposed on one side of the electronic device detecting the reference object among the plurality of sensors, the electronic device is configured to move such that a sensor disposed on a side opposite to the one side based on a center of the electronic device detects the reference object.

14. The method of claim 1, wherein a range of a field of view of the target sensor comprises a longitudinal axis of a ground coordinate system set for the electronic device.

15. The method of claim 1, wherein the plurality of sensors comprise any one or any combination of any two or more of camera sensors, lidar sensors, infrared sensors, and ultrasonic sensors.

16. The method of claim 1, wherein the electronic device is mounted on any one or any combination of any two or more of a drone, a vehicle, and a drivable robot.

17. A non-transitory computer-readable storage medium storing instructions that, when executed by one or more processors, configure the one or more processors to perform the method of claim 1.

18. An electronic device, comprising:

one or more processors configured to:

estimate a portion of a rotation parameter for a target sensor among a plurality of sensors based on a capture of a reference object;

estimate another portion of the rotation parameter for the target sensor based on an intrinsic parameter of the target sensor and a focus of expansion (FOE), the FOE being a point at which an optical flow converges in consecutive frame images, the another portion being determined based on sensing data collected with consecutive frames by the target sensor while an electronic device rectilinearly moves based on one axis;

perform calibration by determining a first extrinsic parameter for the target sensor based on the portion and the another portion of the rotation parameter;

determine first candidate extrinsic parameters respectively for at least a portion of a plurality of frames; and determine the first extrinsic parameter by integrating the first candidate extrinsic parameters; and wherein the determining of the first extrinsic parameter comprises removing an outlier value from the first candidate extrinsic parameters and integrating the remaining values.

19. The device of claim 18, wherein the device is a vehicle further comprising the plurality of sensors disposed such that at least a portion of a field of view of each sensor overlaps a field of view of another sensor.

\* \* \* \* \*